Patented Apr. 1, 1952

2,591,623

UNITED STATES PATENT OFFICE 2,591,623

PROCESS FOR THE PRODUCTION OF A PLASTIC MATERIAL FROM SHELLAC AND RESINOLS LIKE BHILAWAN SHELL LIQUID OR CASHEW SHELL LIQUID SUITABLE FOR MAKING MOULDING POWDERS, COATING COMPOSITIONS, ADHESIVES OR THE LIKE

Salimuzzaman Siddiqui, New Delhi, Krishen Kumar Sarin and Jyoti Prasad Varma, Poona, India, assignors to Council of Scientific and Industrial Research, New Delhi, India No Drawing. Application May 1, 1950, Serial No. 159,381. In India May 9, 1949

7 Claims. (Cl. 260—24)

This invention relates to the production of a plastic material from shellac and resinols such as bhilawan shell liquid or cashew shell liquid, the product being suitable for making moulding powders, coating compositions, adhesives or the like.

The term "resinol" applies to naturally occurring resinous liquids obtained from the pericarp of the nuts or incised trunks of plants belonging to the natural order "Anacardiaceae." The application of the term to this category of products is based on the fact that they are all of them resin forming (polymerisable) substances, composed mainly of di-hydroxy-benzene derivatives with a $C_{15}$ or $C_{17}$ straight unsaturated side chain, or polymers thereof. The term is broadened to include cashew shell liquid, which apart from a di-hydroxy-benzene derivative (cardol) also consists of a salicylic acid derivative, namely anacardic acid, which on thermal expulsion in the process of decortication of the nuts, is decarboxylated to a mono phenol (m, $C_6H_4.OH.C_{15}H_{27}$). Other constituents of this category of products are bhilawanol (1,2,3—$C_6H_3(OH)_2C_{15}H_{27}$) from the nuts of *Semecarpus anacardium*, Linn.; urishiol (1,2,3—$C_6H_3(OH)_2C_{15}H_{27}$) from the dried latex "Ki-urushi" of the Chinese and Japanese lacquer plants, *Rhus vernicifera;* laccol from the Siamese, Indo Chinese and Formosan lacquer plants, *Rhus ambigua, Rhus succedanea* and *Semecarpus vernicifera* respectively; and thitsiol from the Burmese lacquer plant, *Melanorrhoea usitata*, Wall. (1.2.4.$C_6H_3(OH)_2C_{17}H_{31}$). Bhilawanol and urishiol are so closely allied, that they actually differ from each other only in the number and position of the double bonds in the $C_{15}H_{27}$-side chain, common to both of them. This difference is, however, significant enough to bring about a far greater tendency in the case of urishiol towards polymerisation.

Bhilawan shell liquid or bhilawan resin is a darkish, resinous liquid occurring in the honeycomb structure of the pericarp of the nuts, which consists of about 50 to 70% of bhilawanol and 50 to 30% of polymerised product, the proportion mainly depending upon the age and conditions of storage of the nuts. The shell liquid can be obtained by any of the following processes:

(1) Extraction of the incised or lightly crushed nuts with lower boiling organic solvents, preferably petroleum ether, (2) Pressing out the nuts, preferably under heat in a hydraulic press or in a rotary crusher, (3) Heat expulsion of the liquid by roasting the nuts, preferably at 200 to 400° C., in retorts fitted with a lower outlet for draining out the shell liquid into the receiver system, (4) Expulsion of the liquid by exposing the nuts to superheated steam at temperatures ranging from 200 to 280° C., as described in the Indian Patents Nos. 32,237 and 34,873.

While in the above processes 1, 2 and 4 the shell liquid is obtained in the form in which it occurs in the nuts, in the process of dry heat expulsion (3), it is subjected to a partial thermal degradation and polymerisation, yielding a more viscous liquid from which hardly any "bhilawanol" as such can be obtained. It is this material, however, which on account of the comparatively easy and less costly procedure forms the actual commercial product in India at present. Shell liquid obtained by any of the processes referred to above will, however, work suitably for the purposes of the present invention.

*Cashew shell liquid.*—The shell liquid obtained from the nut shells through solvent extraction consists mainly of anacardic acid $$(C_6H_3(OH)(COOH)C_{15}H_{27})$$

and to the extent of about 10% of a long chain di-hydroxy-benzene derivative, "cardol." The article of commerce, however, obtained in the process of decortication of the nuts entailing a prior roasting operation, consists mainly of the de-carboxylation product of anacardic acid.

Ki-urushi and other resinols from lacquer plants are dried "latices," obtained by incising the trunk of the various trees, to which reference has already been made. They form viscous, blackish liquids, generally employed in East Asian countries since ancient times for lacquering purposes.

It is hitherto known to produce a non-vesicating drying product for the manufacture of coating compositions or like materials by adding resins, resinols or oils to bhilawan shell liquid and heating the mixture.

We have found that by interacting shellac, by which we mean lac or shellac in any available form, and resinols such as bhilawan shell liquid or cashew shell liquid under steam pressure, a plastic material may be obtained which may be employed for making moulding powders, coating compositions, adhesives or the like products. On dry heating, shellac tends to lose its plasticity which is its greatest asset. With the interaction of resinols with the shellac complex under steam pressure as described hereinbelow, it is possible to obtain a resin which, unlike the shell liquid or the resin obtained therefrom according to hitherto known processes, is insoluble in hydrocarbon solvents and has much higher water resistance than shellac, the sphere of utility of which is greatly restricted by this factor.

Accordingly, our process for producing a plastic material suitable for making moulding powders, coating compositions, adhesives or the like consists in interacting shellac and resinols such as bhilawan shell liquid or cashew shell liquid under steam pressure until a homogeneous reaction product insoluble in hydrocarbon solvents but soluble in alcohol is obtained. The reaction product may be used as such for making coating compositions such as spirit varnishes. Alternatively, the homogeneous reaction product may be cured by heating, the solubility of the product in alcohol decreasing with the extent of curing until, as described in the specification of our co-pending U. S. application Serial No. 159,382, filed May 1, 1950, relating to the manufacture of moulding powders, it is converted to an insoluble resin. At the (alcohol) soluble stage after subsequent partial curing also, the resin can be employed for the preparation of coating compositions such as spirit varnishes or adhesives by the usual methods.

The water resistance of the resultant product increases with the proportion of resinol incorporated and we have found with reference to bhilawan shell liquid, that it can be up to 18-20% on the weight of shellac for obtaining a hydrocarbon insoluble interaction product by subjection to steam pressure. Any excess over this remains unreacted and can be removed by digestion with hydrocarbon solvent. If, however, the resultant material is subjected to a curing process under heat, larger quantities of the resinol extending to about 1:1 part by weight of shellac can be incorporated for obtaining an insoluble resin.

The shellac and resinols are reacted by heating with water in an autoclave to pressures ranging from 30-40 lbs. to 100 lbs. per square inch, for about 1 to 5 hours.

According to a preferred mode of carrying out our process, about 18-20% by weight of bhilawan (or cashew) shell liquid is reacted with shellac by heating with water in an autoclave to pressures ranging from 30-40 lbs. per square inch for about 1½ hours. The reaction product which is a darkish brown, homogeneous mass, may be used as such in the manufacture of coating compositions such as spirit varnishes. Alternatively the reaction mass is further worked to obtain moulding powder in the manner described in the specification of our co-pending application Serial No. 159,382.

We claim:

1. In the manufacture of plastic materials suitable for use as molding powders, coating compositions, adhesives and the like from resinols obtained from the pericarp of the nuts and incised trunks of plants belonging to the natural order Anacardiaceae, the process which comprises subjecting shellac mixed with such a resinol, in quantity amounting to at least about 18 per cent by weight, based on the weight of the shellac, and not substantially exceeding an equal part by weight, to the action of steam at a pressure within the range of from about 30 to 100 pounds per square inch, for a period ranging from about 1 to 5 hours until a homogeneous reaction product is obtained which is insoluble in hydrocarbon solvents but soluble in alcohol.

2. The process of claim 1 wherein the quantity of resinol employed is within the range of from about 18 to 20 per cent by weight based on the weight of the shellac and the steam is maintained at a pressure of from about 30 to 40 pounds per square inch for a period of from about 1 to 1½ hours.

3. The process of claim 1 followed by dissolving the product in a solvent to form a spirit varnish.

4. The process of claim 1 followed by digestion of the product with a hydrocarbon solvent to remove any unreacted resinol.

5. A homogeneous plastic material which is the reaction product of shellac and from about 18 per cent, based on the weight of the shellac, to an equal part by weight of a resinol obtained from the pericarp of the nuts and incised trunks of plants belonging to the natural order of Anacardiaceae, produced by subjecting a mixture of the resinol and shellac to the action of steam at a pressure ranging from about 30 to 100 pounds per square inch, for a period of from about 1 to 5 hours; said material being insoluble in hydrocarbons but soluble in alcohol.

6. A homogeneous plastic material which is the reaction product of shellac and from about 18 to 20 per cent, based on the weight of the shellac, of a resinol obtained from the pericarp of the nuts and the incised trunks of plants belonging to the natural order of Anacardiaceae, produced by subjecting a mixture of the shellac and resinol to the action of steam at a pressure of from about 30 to 40 pounds per square inch for a period ranging from about 1 to 1½ hours; said material being insoluble in hydrocarbons but soluble in alcohol.

7. In the manufacture of plastic materials suitable for use as molding powders, coating compositions, adhesives and the like, the process which comprises mixing shellac with from about 18 to 20 per cent of bhilawan shell liquid, based on the weight of the shellac, subjecting the mixture to the action of steam at a pressure of from about 30 to 40 pounds per square inch for from about 1 to 1½ hours to produce a homogeneous reaction product which is insoluble in hydrocarbons but soluble in alcohol.

SALIMUZZAMAN SIDDIQUI.
KRISHEN KUMAR SARIN.
JYOTI PRASAD VARMA.

REFERENCES CITED

The following references are of record in the file of this patent:

| Number | Name | Date |
|---|---|---|
| 2,225,034 | Connors | Dec. 17, 1940 |
| 2,269,347 | Schaufelberger | Jan. 6, 1942 |